(12) United States Patent
Shestak et al.

(10) Patent No.: US 8,746,887 B2
(45) Date of Patent: Jun. 10, 2014

(54) STEREOSCOPIC IMAGE PROJECTION SYSTEM

(75) Inventors: Sergey Shestak, Suwon-si (KR);
Dae-sik Kim, Hwaseong-si (KR);
Kyung-hoon Cha, Yongin-si (KR);
Jae-phil Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 719 days.

(21) Appl. No.: 12/842,330

(22) Filed: Jul. 23, 2010

(65) Prior Publication Data

US 2011/0019152 A1    Jan. 27, 2011

Related U.S. Application Data

(60) Provisional application No. 61/228,214, filed on Jul. 24, 2009.

(30) Foreign Application Priority Data

Oct. 30, 2009 (KR) ........................ 10-2009-0104422

(51) Int. Cl.
*G03B 21/00* (2006.01)
(52) U.S. Cl.
USPC .............................................. 353/7; 359/465

(58) Field of Classification Search
USPC ........................... 353/7–9; 359/465, 466, 467
See application file for complete search history.

(56) References Cited

U.S. PATENT DOCUMENTS

| | | | |
|---|---|---|---|
| 5,851,060 A * | 12/1998 | Uchiyama et al. | 353/94 |
| 7,187,420 B2 * | 3/2007 | Yamazaki et al. | 348/752 |
| 2004/0090601 A1 * | 5/2004 | Nakanishi et al. | 353/31 |
| 2004/0118918 A1 * | 6/2004 | Dvorkis et al. | 235/454 |

FOREIGN PATENT DOCUMENTS

| | | | | |
|---|---|---|---|---|
| JP | 2006-235566 | * | 7/2006 | G02B 27/26 |
| JP | 2006-235566 A | | 9/2006 | |

OTHER PUBLICATIONS

English Translation of 2006-235566.*

* cited by examiner

*Primary Examiner* — Francis M Legasse, Jr.
*Assistant Examiner* — Jerry Brooks
(74) *Attorney, Agent, or Firm* — Sughrue Mion, PLLC

(57) ABSTRACT

A stereoscopic image projection system including: a beam projector for projecting a left eye image and a right eye image in a side by side format; a stereoscopic image adaptor for alternately projecting the left eye image and the right eye image onto a screen in a time sequence; and a shutter controller for synchronizing a time sequential operation of the stereoscopic image adaptor and opening and closing of right and left shutters of a user shutter glasses.

26 Claims, 8 Drawing Sheets

STEREOSCOPIC IMAGE PROJECTION SYSTEM

CROSS-REFERENCE TO RELATED PATENT APPLICATION

This application claims the benefit of U.S. Patent Application No. 61/228,214, filed on Jul. 24, 2009, in the United States Patents and Trademark Office and claims priority from Korean Patent Application No. 10-2009-0104422, filed on Oct. 30, 2009, in the Korean Intellectual Property Office, the disclosures of which are incorporated herein in their entirety by reference.

BACKGROUND OF THE INVENTION

1. Field

Exemplary embodiments relate to a stereoscopic image projection system compatible with a 2 dimensional (2D) image projector and having a simple structure.

2. Description of the Related Art

Recently, stereoscopic images have been used in various fields, such as information communication, broadcasting, medical services, games, virtual reality, commercials, education, and the military.

Methods of providing a stereoscopic image include a binocular parallax method of providing a 3-dimensional (3D) image by separating a visual field of a left eye image and that of a right eye image of a stereopair so that the left eye and the right eye of a viewer may see different images. The binocular parallax method is easy to realize since two 2D images are used, and is most often used in a stereoscopic image projection system.

Such a stereoscopic image projection system generally includes two beam projectors each having a polarizing filter. The polarizing filters have polarizing axes that cross each other, and accordingly, the two beam projectors project right and left images on a screen. A user independently recognizes the right and left images through polarizing glasses, thereby perceiving a 3D effect. Since two beam projectors are used, a general stereoscopic image projection system not only has a bulky structure, but also has high manufacturing costs. In addition, the stereoscopic image projection system requires a special screen for maintaining polarization.

SUMMARY

Exemplary embodiments provide a stereoscopic image projection system having a simple structure for easily converting 2D to 3D and visa versa.

According to an exemplary aspect, there is provided a stereoscopic image projection system including: a beam projector for projecting a composite image comprising a left eye image and a right eye image arranged in a side by side format; a stereoscopic image adaptor for alternately projecting the left eye image and the right eye image onto a screen in a time sequence; and a shutter controller for synchronizing a time sequential operation of the stereoscopic image adaptor and opening and closing of right and left shutters of a user shutter glasses.

The stereoscopic image adaptor may include: an image shutter unit including a right shutter and a left shutter that respectively correspond to the left eye image and the right eye image and are controlled to be closed and opened; and an image path converter for converting paths of the left eye image and the right eye image projected from the beam projector such that the left eye image and the right eye image are projected onto the screen through the image shutter unit.

The image path converter may include: a first mirror for reflecting the left and right eye images projected from the beam projector to the image shutter unit; a second mirror for reflecting the right eye image from the right shutter onto the screen; a third mirror for reflecting the left eye image from the left shutter onto the screen.

The stereoscopic image projection system may further include an angle adjustor for adjusting an angle of the second mirror with reference to a predetermined datum line. The stereoscopic image projection system may further include an angle adjustor for adjusting an angle of the third mirror with respect to a predetermined datum line.

The first mirror, the second mirror, and the third mirror may be disposed in such a way that an orientation of the image projected by the beam projector is the same as an orientation of an image formed on the screen. The first mirror, the second mirror, and the third mirror may be disposed in such a way that the reflective surfaces of each reflective surface of the first mirror, the second mirror, and the third mirror are all perpendicular to a common plane.

The first mirror, the second mirror, and the third mirror may be disposed in such a way that an orientation of the image formed on the screen is rotated 90° with respect to an orientation of the image projected by the beam projector. The first mirror, the second mirror, and the third mirror may be disposed in such a way that the reflective surfaces of the second mirror and the third mirror are perpendicular to a common first plane, and the reflective surface of the first mirror is perpendicular to a second plane, different from the first plane.

The image shutter unit may include a liquid crystal shutter.

The stereoscopic image projection system may further include an emitter for generating a synchronization signal and wirelessly transmitting the generated synchronization signal to the user shutter glasses.

According to another aspect of the present invention, there is provided a stereoscopic image projection system having a first mode and a second mode, the system including: a beam projector for projecting an image; a stereoscopic image adaptor for alternately projecting left and right side of the image projected from the beam projector onto a screen in a time sequence in the first mode, and for projecting the whole image projected from the beam projector at once onto the screen in the second mode; and a shutter controller for synchronizing a time sequential operation of the stereoscopic image adaptor and opening and closing of right and left shutters of a user shutter glasses.

In the first mode, the beam projector may project a composite image comprising a left eye image and a right eye image arranged in a side by side format.

The stereoscopic image adaptor may include: an image shutter unit including a right shutter and a left shutter that respectively correspond to the left eye image and the right eye image and are controlled to be closed and opened; and an image path converter for converting a path of the image projected from the beam projector.

The image path converter may include: a first mirror for reflecting the image projected from the beam projector to the image shutter unit; and second and third mirrors for converting a path of the image that passed through the image shutter unit to the screen, wherein the second and third mirrors have adjustable angles with respect to a predetermined datum line.

In the first mode, the angles of the second and third mirrors may be adjusted in such a way that the second mirror reflects the right eye image that passed through the right shutter to the screen, and the third mirror reflects the left eye image that passed through the left shutter to the screen.

In the second mode, the angles of the second and third mirrors may be adjusted in such a way that reflective surfaces of the second and third mirrors lie in a single plane.

According to another aspect of the present invention, there is provided a stereoscopic image projection system having a first mode and a second mode, the system including: a beam projector for projecting an image; a stereoscopic image adaptor for alternately projecting left and right sides of the image projected from the beam projector onto a screen in a time sequence; a driving mirror unit for reflecting the image projected from the beam projector to the stereoscopic image adaptor in a first mode, and for reflecting the image projected from the beam projector directly onto the screen in a second mode; and a shutter controller for synchronizing a time sequential operation of the stereoscopic image adaptor and opening and closing of right and left shutters of a user shutter glasses.

In the first mode, the beam projector may project a composite image comprising a left eye image and a right eye image arranged in a side by side format, in order to form a stereoscopic image.

The driving mirror unit may include a switching mirror, and a first mirror, wherein the switching mirror may be switched between a transparent state and a mirror state and may be moveable, wherein the switching mirror may be controlled to reflect the image projected from the beam projector to the stereoscopic image adaptor in the first mode and to allow the image projected from the beam projector to pass to the first mirror in the second mode.

BRIEF DESCRIPTION OF THE DRAWINGS

The above and other exemplary aspects and advantages will become more apparent by describing in detail exemplary embodiments thereof with reference to the attached drawings in which.

DETAILED DESCRIPTION OF EXEMPLARY EMBODIMENTS

Figure 1:
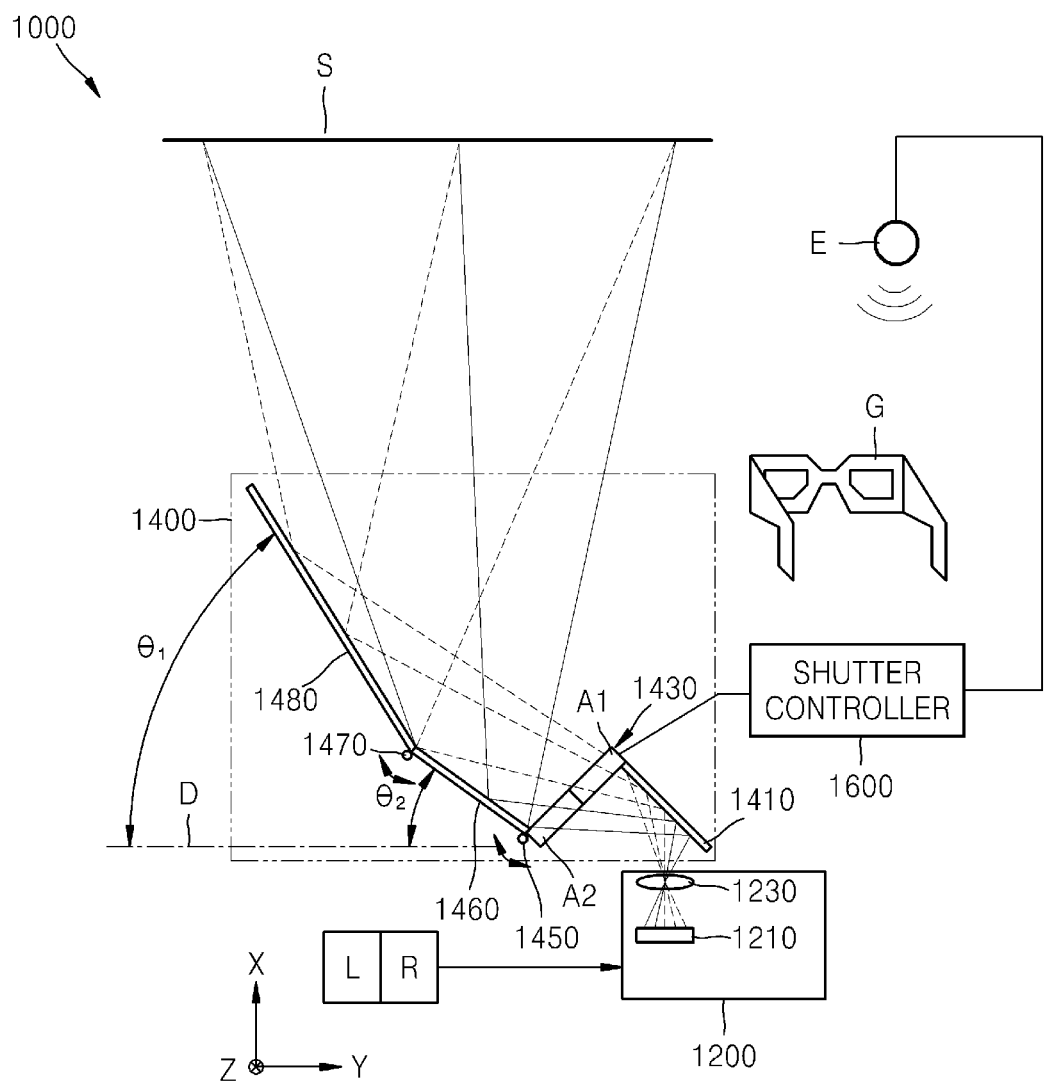
FIG. 1 is a plan view illustrating a schematic structure of a stereoscopic image projection system according to an exemplary embodiment.

Hereinafter, the present invention will be described more fully with reference to the accompanying drawings, in which exemplary embodiments are shown. In the drawings, like reference numerals denote like elements, and the sizes elements may be exaggerated for clarity.

FIG. 1 is a plan view illustrating a schematic structure of a stereoscopic image projection system 1000 according to an exemplary embodiment. The stereoscopic image projection system 1000 includes a beam projector 1200 for projecting an image, a stereoscopic image adaptor 1400 for projecting the image projected from the beam projector 1200 onto a screen S in a time sequence by dividing the image into right and left images, and a shutter controller 1600 for synchronizing a time sequential operation of the stereoscopic image adaptor 1400 and right/left opening/closing of a user shutter glasses G.

The beam projector 1200 includes a display panel 1210 and at least one projection lens 1230, and projects an image having a left eye image L and right eye image R in a side by side format so as to form a stereoscopic image on the screen.

The stereoscopic image adaptor 1400 projects the left eye image L and the right eye image R projected from the beam projector 1200 onto the screen S in a time sequence. Accordingly, the stereoscopic image adaptor 1400 includes an image shutter unit 1430 including two areas A1 and A2 that respectively correspond to the left eye image L and the right eye image R and are controlled to be closed and opened, and an image path converter for converting a path of the image projected from the beam projector 1200 in such a way that the left eye image L and the right eye image R are time sequentially projected onto the screen S through the image shutter unit 1430.

The image shutter unit 1430 may include a liquid crystal shutter, which will be described later in detail with reference to FIG. 2.

The image path converter may include a first mirror 1410 for reflecting the image projected from the beam projector 1200 to the image shutter unit 1430, a second mirror 1460 for reflecting the right eye image R, which passed through one of the two areas A1 and A2 of the image shutter unit 1430, for example, the area A2, onto the screen S, and a third mirror 1480 for reflecting the left eye image L, which passed through the other of the two areas A1 and A2 of the image shutter unit 1430, that is, the area A1, onto the screen S.

Angles of the second mirror 1460 and the third mirror 1480 are suitably adjusted such that the second mirror 1460 and the third mirror 1480 respectively reflect the right eye image R, which passed through the area A2, and the left eye image L, which passed through the area A1, onto the same location on the screen S. Accordingly, the image path converter may further include an angle adjustor 1450 for adjusting an angle θ2 of the second mirror 1460 with respect to a datum line D, and an angle adjustor 1470 for adjusting an angle θ1 of the third mirror 1480 with respect to the datum line D. Each of the angle adjustors 1450 and 1470 may include an actuator, for example, various driving motors, such as a piezo motor, or a device for manually adjusting the angle thereof.

The first mirror 1410, the second mirror 1460, and the third mirror 1480 may be disposed in different arrangements for performing the function described above. In the current embodiment, the first mirror 1410, the second mirror 1460, and the third mirror 1480 are disposed in such a way that a vertical direction of the image projected from the beam projector 1200 is a vertical direction of an image formed on the screen S. In other words, an orientation of the image projected from the beam projector 1200 is the same as an orientation of an image formed on the screen S. For example, as shown in FIG. 1, the first mirror 1410, the second mirror 1460, and the third mirror 1480 may be disposed in such a way that reflective surfaces of the first mirror 1410, the second mirror 1460, and the third mirror 1480 are all perpendicular to a common plane. As shown in FIG. 1, the reflective surfaces of the mirrors are perpendicular to the XY plane.

The shutter controller 1600 synchronizes opening and closing of the two areas A1 and A2 of the image shutter unit 1430 and opening and closing of right and left sides of the user shutter glasses G. The user shutter glasses G may be controlled wirelessly or by wiring. For example, the stereoscopic image projection system 1000 may further include an emitter E for generating a synchronization signal and wirelessly transmitting the generated synchronization signal to the user shutter glasses G.

A process of forming a stereoscopic image on the screen S by using the stereoscopic image projection system 1000 will now be described. The image projected from the beam projector 1200 has a side by side format, wherein the left eye image L and the right eye image R are in adjacent to each other in the one composite image projected from the beam projector. The image projected from the beam projector 1200 is reflected on the first mirror 1410 and is incident on the image shutter unit 1430. The two areas A1 and A2 of the image shutter unit 1430 are synchronized with right and left opening and closing of the user shutter glasses G by the shutter controller 1600 such that one of the left eye image L and the right eye image R passes through one of the areas and the other is blocked by the other area. In other words, when the area A1 is opened to pass light and the area A2 is closed to block light, only the left eye image L is projected onto the screen S via the area A1 of the image shutter unit 1430 and the third mirror 1480. Alternatively, when the area A2 is opened to pass light and the area A1 is closed to block light, only the right eye image R is projected onto the screen S via the area A2 of the image shutter unit 1430 and the second mirror 1460. In this way, the user recognizes the left eye image L and the right eye image R in a time sequence through the user shutter glasses G having right and left sides that are opened and closed in synchronization with the opening and closing of the two areas A1 and A2 of the image shutter unit 1430, and may perceive a stereoscopic image according to an afterimage effect when the left eye image L and the right eye image R are changed very quickly, for example, twice a frame rate of the image projected from the beam projector 1200.

Figure 2:
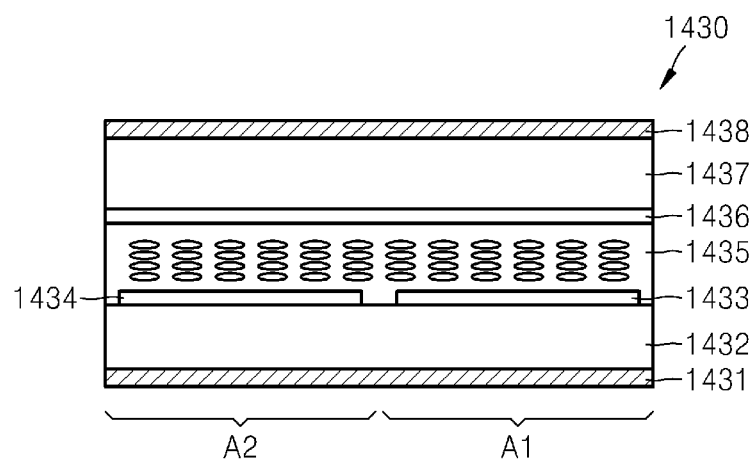
FIG. 2 is a cross-sectional view illustrating a schematic structure of a liquid crystal shutter that may be used as an image shutter unit of the stereoscopic image projection system of FIG. 1.

FIG. 2 is a cross-sectional view illustrating a schematic structure of a liquid crystal shutter that may be used as the image shutter unit 1430 of the stereoscopic image projection system 1000 of FIG. 1. The liquid crystal shutter includes a liquid crystal layer 1435 between two transparent substrates 1432 and 1437, wherein the transparent substrate 1437 includes a common electrode 1436, and the transparent substrate 1432 includes individual electrodes 1433 and 1434 for respectively defining the two areas A1 and A2, which may be described as left and right shutters. Polarizing plates 1431 and 1438 are respectively disposed on outer surfaces of the transparent substrates 1432 and 1437. Liquid crystal molecules forming the liquid crystal layer 1435 are arranged along the same direction as an electric field, and maintains or converts polarization of incident light based on whether the electric field is applied or not. In other words, light incident on the liquid crystal layer 1435 in a predetermined polarization state by the polarizing plate 1431 maintains or converts polarization according to the arrangement of the liquid crystal molecules according to the electric field, and thus passes or does not pass through the polarizing plate 1438 accordingly. As such, the opening and closing of the two areas A1 and A2 are controlled based on whether a voltage is applied to the individual electrodes 1433 and 1434.

Figure 3A:
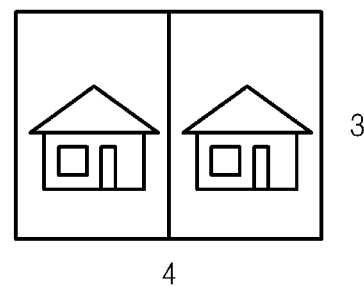
FIGS. 3A and 3B are image formats, respectively showing an input format to a beam projector and a display format on a screen of the stereoscopic image projection system of FIG. 1.
Figure 3B:
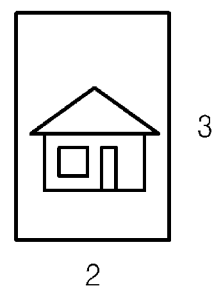

FIGS. 3A and 3B are image formats, respectively showing an input format to the beam projector 1200 and a display format on the screen S of the stereoscopic image projection system 1000 of FIG. 1. When the input format has an aspect ratio of 4:3 as shown in FIG. 3A, the display format has an aspect ratio of 2:3 as shown in FIG. 3B.

Figure 4:
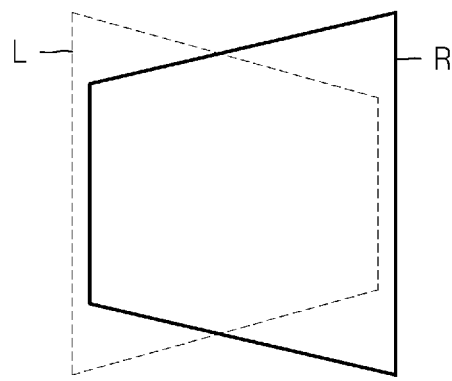
FIG. 4 is a diagram of a left eye image and a right eye image that are pre-distorted for keystone correction.

FIG. 4 is a diagram of the left eye image L and the right eye image R pre-distorted for keystone correction. Since the beam projector 1200 is designed on the premise that the beam projector 1200 is generally disposed facing the screen S, when the beam projector 1200 is at an angle with respect to the screen S, an image projected may be distorted into a trapezoid shape. Accordingly, in order to correct such keystone distortion, the beam projector 1200 may project a pre-distorted image by using an image warping method. The left eye image L and the right eye image R may be pre-distorted as shown in FIG. 4, to offset the keystone distortion.

Figure 5:
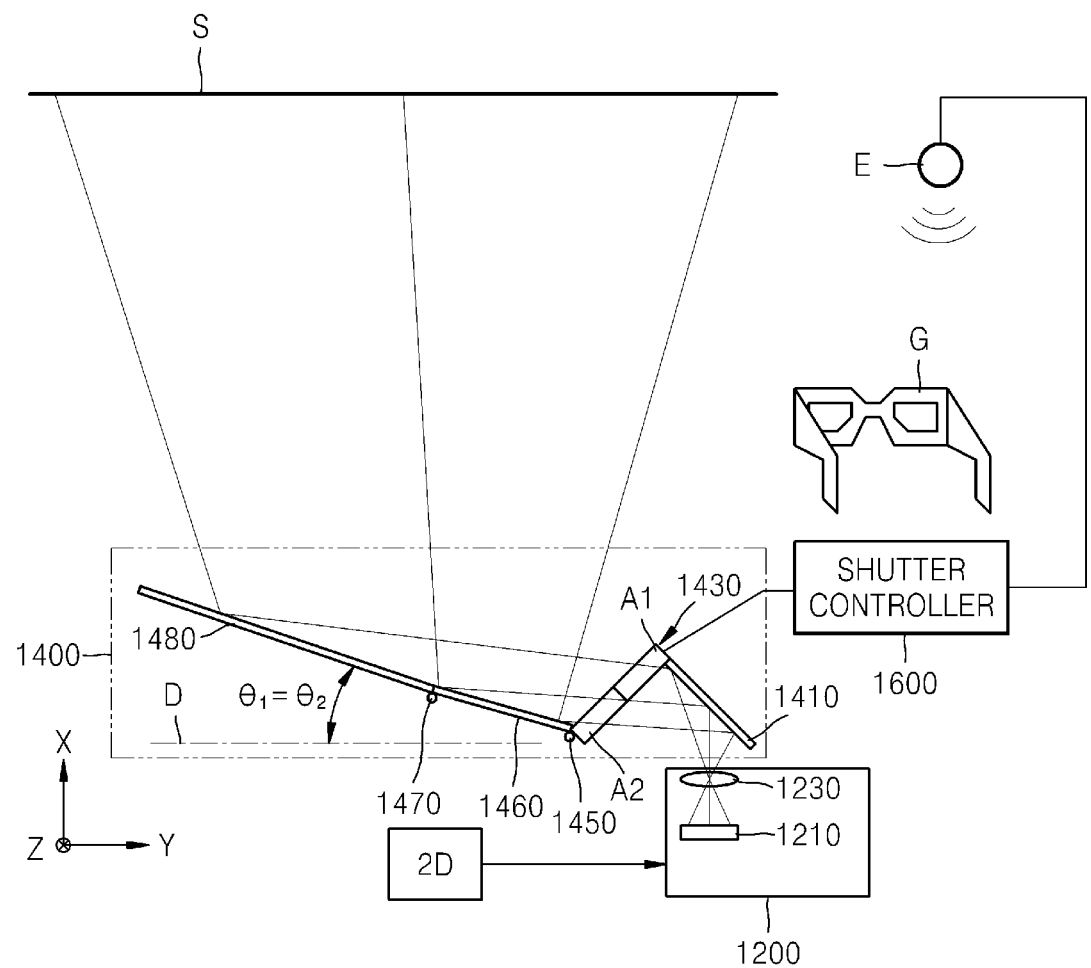
FIG. 5 is a diagram for describing the stereoscopic image projection system of FIG. 1 operating as a 2 dimensional (2D) image projection system.

FIG. 5 is a diagram for describing the stereoscopic image projection system 1000 of FIG. 1 operating as a 2 dimensional (2D) image projection system. The angles θ2 and θ1 of the second and third mirrors 1460 and 1480 may be adjusted to be the same, and accordingly, the reflective surfaces thereof are lined up and form a plane. The beam projector 1200 projects a 2D image in which right and left eye images are not differentiated, and the two areas A1 and A2 of the image shutter unit 1430 are in an open state. Accordingly, the image projected from the beam projector 1200 is projected onto the screen S while maintaining an original resolution.

Figure 6A:
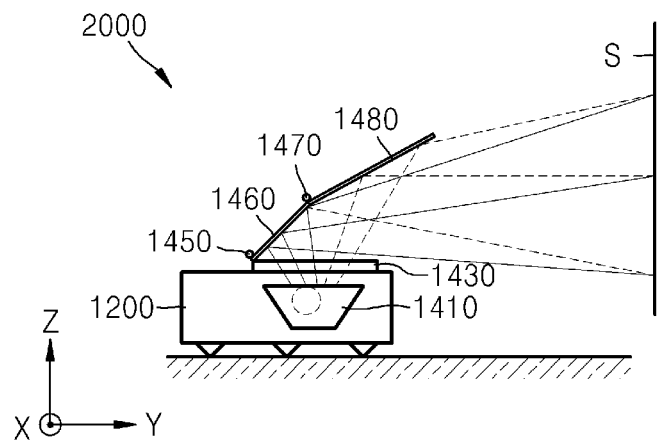
FIGS. 6A and 6B are respectively a side view and a front view illustrating a schematic structure of a stereoscopic image projection system, according to another exemplary embodiment.
Figure 6B:
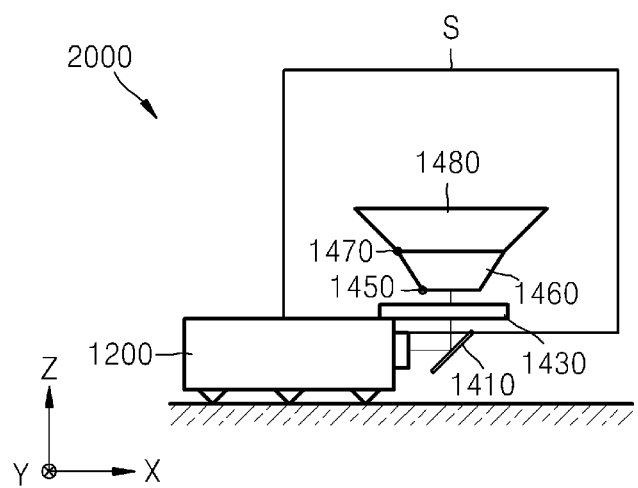

FIGS. 6A and 6B are respectively a side view and a front view illustrating a schematic structure of a stereoscopic image projection system 2000, according to another embodiment of the present invention.

The current embodiment of the present invention is different from the previous embodiment, since the first mirror 1410, the second mirror 1460, and the third mirror 1480 are disposed in such a way that the vertical direction of the image projected from the beam projector 1200 is a horizontal direction of the image formed on the screen S. In other words, an orientation of the image formed on the screen S is rotated 90° from an orientation of the image as projected from the beam projector. As shown in FIGS. 3A and 3B, according to the previous embodiment of the present invention, the input format changes from a landscape view to a portrait view on the screen S. However, considering that a television (TV) or a projection display generally displays a landscape image having an aspect ratio of 4:3 or 16:9, a portrait image may be awkward or inconvenient to be viewed. Accordingly, in the current embodiment, the first mirror 1410, the second mirror 1460, and the third mirror 1480 may be disposed in such a way that an orientation of the image formed on the screen is rotated 90° from an orientation of the image projected from the beam projector 1200. For example, the first mirror 1410, the second mirror 1460, and the third mirror 1480 are disposed in such a way that reflective surfaces of the second mirror 1460 and the third mirror 1480 are perpendicular to a common first plane (the YZ plane as shown in FIG. 6A), and the reflective surface of the first mirror 1410 is perpendicular to a second plane (the XZ plane as shown in FIG. 6B), different from the first plane. Accordingly, an orientation of the image as incident on the screen S is rotated by 90° with respect to an orientation of the image as projected from the beam projector 1200.

Figure 7A:
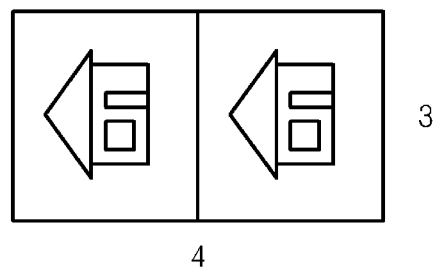
FIGS. 7A and 7B are image formats, respectively an input format to a beam projector and a display format on a screen of the stereoscopic image projection system of FIG. 6A.
Figure 7B:
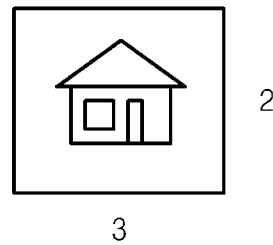
Figure 8:
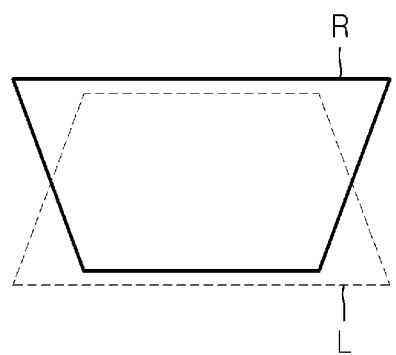
FIG. 8 is a diagram of a left eye image and a right eye image that are pre-distorted for keystone correction.

FIGS. 7A and 7B are image formats, respectively an input format to the beam projector 1200 and a display format on the screen S of the stereoscopic image projection system 2000 of FIG. 6A. Left and right eye images are rotated by 90° and form a side by side format as shown in FIG. 7A, and an image finally projected onto the screen S has a landscape view having an aspect ratio of 3:2 as shown in FIG. 7B. An image input to the beam projector 1200 may be pre-distorted for keystone correction, and a left eye image L and a right eye image R that are distorted as shown in FIG. 8 may be used.

The stereoscopic image projection system 2000 may also include the angle adjustors 1450 and 1470 for respectively adjusting the angles θ2 and θ1 of the second mirror 1450 and the third mirror 1480, and may be used as a 2D image projection system by adjusting the angles θ2 and θ1 such that the reflective surfaces of the second mirror 1460 and the third mirror 1480 are in one plane.

Figure 9:
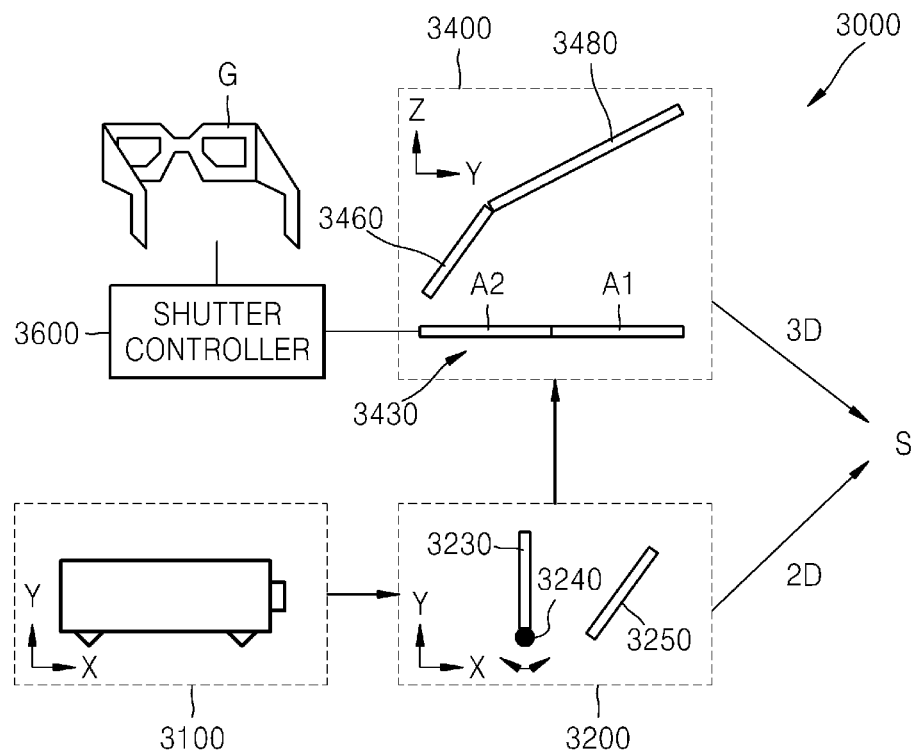
FIG. 9 is a diagram for schematically describing a stereoscopic image projection system operating as a 2D/3D compatible projection system, according to an exemplary embodiment.
Figure 10A:
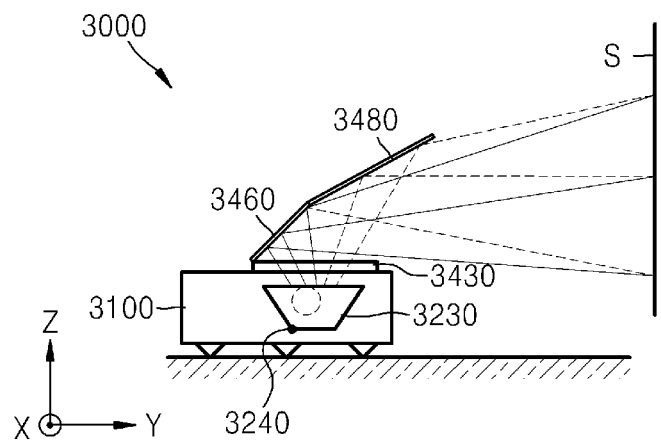
FIGS. 10A and 10B are respectively a side view and a front view illustrating a schematic structure of the stereoscopic image projection system of FIG. 9 and an optical path for projecting a 3D image.
Figure 10B:
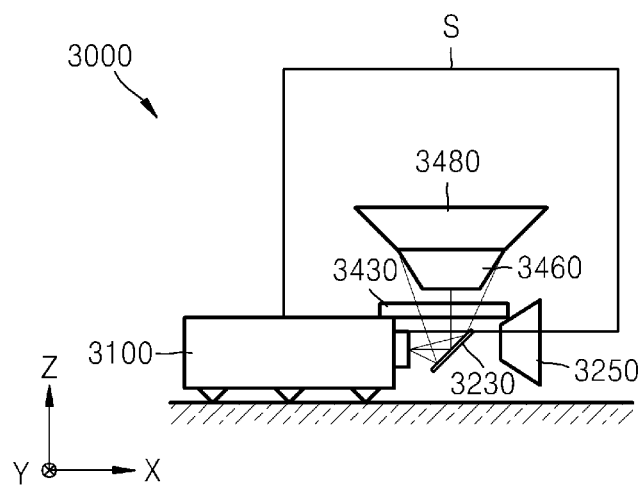
Figure 11A:
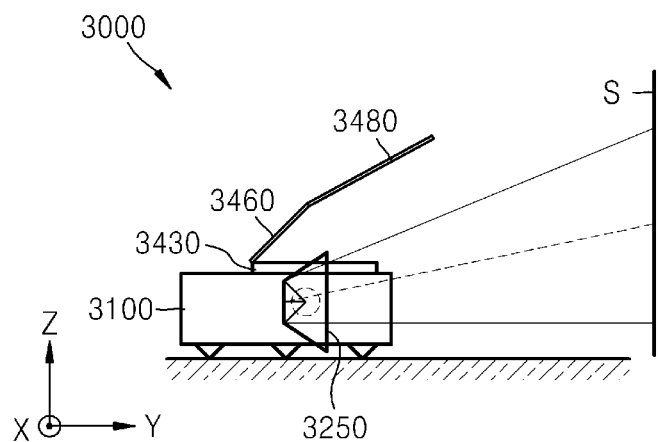
FIGS. 11A and 11B are respectively a side view and a front view illustrating another schematic structure of the stereoscopic image projection system of FIG. 9 and an optical path for projecting a 2D image.
Figure 11B:
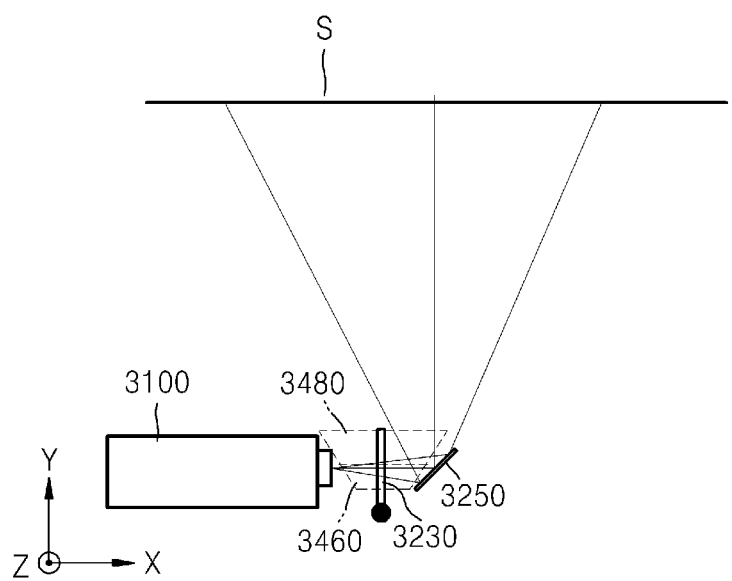

FIG. 9 is a diagram for schematically describing a stereoscopic image projection system 3000 for operating as a 2D/3D compatible projection system, according to an exemplary embodiment, FIGS. 10A and 10B are respectively a side view and a front view illustrating a schematic structure of the stereoscopic image projection system 3000 of FIG. 9 and an optical path for projecting a 3D image, and FIGS. 11A and 11B are respectively a side view and a front view illustrating a schematic structure of the stereoscopic image projection system 3000 of FIG. 9 and an optical path for projecting a 2D image.

First, referring to FIG. 9, the stereoscopic image projection system 3000 includes a beam projector 3100 for projecting an image, a stereoscopic image adaptor 3400 for projecting the image projected from the beam projector 3100 onto a screen S in a time sequence by dividing the image into right and left images, a driving mirror unit 3200 for reflecting the image projected from the beam projector 3100 to the stereoscopic image adaptor 3400 in a first mode and directly projecting the image projected from the beam projector 3100 onto the screen S in a second mode, and a shutter controller 3600 for synchronizing a time sequential operation of the stereoscopic image adaptor 3400 and right and left opening and closing of a user shutter glasses G. The user shutter glasses G may be controlled wirelessly or by wiring. For example, the stereoscopic image projection system 3000 may further include an emitter (not shown) for generating a synchronization signal and wirelessly transmitting the generated synchronization signal to the user shutter glasses G.

The driving mirror unit 3200 may include a switching mirror 3230 and a first mirror 3250. The switching mirror 3230 switches between a transparent state and a mirror state, and is formed of a material that may switch between a transparent state, in which incident light may pass through, and a mirror state, in which the incident light may be reflected, according to an electric signal. Also, the switching mirror 3230 may be rotated to change the direction in which light is reflected according to a driver 3240 prepared at one end of the switching mirror 3230. For example, the switching mirror 3230 may uni-axially rotate by using a side that is parallel to a Y-axis as an axis. In the first mode for forming a stereoscopic image, the image projected from the beam projector 3100 is reflected to the stereoscopic image adaptor 3400 by the switching mirror 3230, and in the second mode for forming a 2D image, the image projected from the beam projector 3100 passes through the switching mirror 3230 in the transparent state and then is reflected onto the screen S by the first mirror 3250.

The stereoscopic image adaptor 3400 may include an image shutter unit 3430 including two areas A1 and A2 that are opened and closed corresponding to left and right of the image projected from the beam projector 3200, a second mirror 3460 for reflecting a right eye image that passed through one of the two areas A1 and A2 onto the screen S, and a third mirror 3480 for reflecting a left eye image that passed through the other of the two areas A1 and A2 onto the screen S.

The optical path for the stereoscopic image projection system 3000 projecting a 3D image will now be described with reference to FIGS. 9, 10A, and 10B. In the first mode for forming a stereoscopic image, the driving mirror unit 3200 reflects the image projected from the beam projector 3100, i.e., an image in which a left eye image and a right eye image are in a side by side format, to the stereoscopic image adaptor 3400. For such operation, the switching mirror 3230 of the driving mirror unit 3200 is in a mirror state, and is rotated such that light reflected at a reflective surface of the switching mirror 3230 proceeds to the stereoscopic image adaptor 3400. In other words, the image projected from the beam projector 3100 has its path changed and is incident on the image shutter unit 3430. Since the first mirror 3250 is not on a current optical path of the image proceeding to the screen S, the first mirror 3250 is not illustrated in FIG. 10A. As described in previous exemplary embodiments, the two areas A1 and A2 of the image shutter unit 3430 are opened and closed in synchronization with a user shutter glass (not shown) by a shutter controller (not shown). A right eye image that passed through one of the two areas A1 and A2 is projected onto the screen S after being reflected on the second mirror 3460, and a left eye image that penetrated the other of the two areas A1 and A2 is projected onto the screen S after being reflected on the third mirror 3480. As such, a user perceives a 3D image according to the left eye image and the right eye image projected onto the screen S in time sequence.

The optical path for the stereoscopic image projection system 3000 projecting a 2D image will now be described with reference to FIGS. 9, 11A, and 11B. Referring to FIGS. 9, 11A, and 11B, in the second mode for forming a 2D image, the driving mirror unit 3200 reflects the whole image projected from the beam projector 3100 onto the screen S. For such operation, the switching mirror 3230 is in a transparent state so as to allow the image projected from the beam projector 3100 to pass through the first mirror 3250. The image has its path changed and now proceeds to the screen S due to the first mirror 3250, and thus is projected onto the screen S.

The stereoscopic image projection system of the present invention is easily converted into a 2D projector, has reduced manufacturing expenses, has improved image format, and does not require a special screen.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A stereoscopic image projection system comprising:
a beam projector which projects a composite image comprising a left eye image and a right eye image arranged in a side by side format;
a stereoscopic image adaptor which alternately projects the left eye image and the right eye image onto a screen in a time sequence; and
a shutter controller which synchronizes a time sequential operation of the stereoscopic image adaptor with an opening and a closing of a right glasses shutter and a left glasses shutter of a user shutter glasses;
wherein the stereoscopic image adaptor comprises:
an image shutter unit comprising a right shutter unit shutter and a left shutter unit shutter respectively receiving the left eye image and the right eye image projected from the beam projector; and
an image path converter for converting paths of the left eye image and the right eye image projected from the beam projector and transmitted through the image shutter unit such that the left eye image and the right eye image are projected onto the screen such that an area of the screen onto which the right eye image is projected is the same as an area of the screen onto which the left eye image is projected.

2. The stereoscopic image projection system of claim 1, wherein the image path converter comprises:
a first mirror which reflects the left and the right eye images projected from the beam projector to the image shutter unit;
a second mirror which reflects the right eye image from the image shutter unit onto the screen;
a third mirror which reflects the left eye image from the image shutter unit onto the screen.

3. The stereoscopic image projection system of claim 2, further comprising an angle adjustor which adjusts an angle of the second mirror with reference to a datum line.

4. The stereoscopic image projection system of claim 2, further comprising an angle adjustor which adjusts an angle of the third mirror with respect to a datum line.

5. The stereoscopic image projection system of claim 2, wherein the first mirror, the second mirror, and the third mirror are disposed in such a way that an orientation of the right eye image and the left eye image projected by the beam projector is the same as an orientation of an image formed on the screen.

6. The stereoscopic image projection system of claim 5, wherein reflective surfaces of the first mirror, the second mirror, and the third mirror are perpendicular to a plane.

7. The stereoscopic image projection system of claim 2, wherein the first mirror, the second mirror, and the third mirror are disposed in such a way that an orientation of the right eye image and the left eye image formed on the screen is rotated by 90° from an orientation of the right eye image and the left eye image projected by the beam projector.

8. The stereoscopic image projection system of claim 7, wherein reflective surfaces of the second mirror and the third mirror are perpendicular to a first plane, and a reflective surface of the first mirror is perpendicular to a second plane, different from the first plane.

9. The stereoscopic image projection system of claim 1, wherein the image shutter unit comprises a liquid crystal shutter.

10. The stereoscopic image projection system of claim 1, wherein the shutter controller further comprises an emitter which generates a synchronization signal and wirelessly transmits the generated synchronization signal to the user shutter glasses.

11. A stereoscopic image projection system having a first mode and a second mode, the image projection system comprising:
a beam projector which projects an image;
a stereoscopic image adaptor, wherein in the first mode, the stereoscopic image adaptor alternately projects a left and a right side of the image projected from the beam projector onto a screen in a time sequence, and in the second mode, the stereoscopic image adaptor projects an entirety of the image projected from the beam projector at once onto the screen; and
a shutter controller which synchronizes a time sequential operation of the stereoscopic image adaptor with an opening and a closing of a right glasses shutter and a left glasses shutter of a user shutter glasses,
wherein the stereoscopic image adaptor comprises:
an image shutter unit comprising a right shutter unit shutter and a left shutter unit shutter respectively receiving the left eye image and the right eye image projected from the beam projector; and
an image path converter which converts a path of the image projected from the beam projector and transmitted through the image shutter unit.

12. The stereoscopic image projection system of claim 11, wherein, in the first mode, the an image is a composite image comprising a left eye image and a right eye image arranged in a side by side format.

13. The stereoscopic image projection system of claim 11, wherein the image path converter comprises:
a first mirror which reflects the image projected from the beam projector to the image shutter unit; and
a second mirror and a third mirror which convert a path of the image from the image shutter unit to the screen, wherein angles of the second and third mirrors are adjustable with respect to a datum line.

14. The stereoscopic image projection system of claim 13, wherein, in the first mode, the angles of the second and third mirrors are adjusted in such a way that the second mirror reflects the right eye image from the right shutter to the screen, and the third mirror reflects the left eye image from the left shutter to the screen.

15. The stereoscopic image projection system of claim 13, wherein, in the second mode, the angles of the second and third mirrors are adjusted in such a way that reflective surfaces of the second and third mirrors both lie in a single plane.

16. The stereoscopic image projection system of claim 13, wherein the first mirror, the second mirror, and the third mirrors are disposed in such a way that an orientation of the image projected from the beam projector is the same as an orientation of an image formed on the screen.

17. The stereoscopic image projection system of claim 16, wherein reflective surfaces of the first mirror, the second mirror, and the third mirror are perpendicular to a plane.

18. The stereoscopic image projection system of claim 13, wherein the first mirror, the second mirror, and the third mirror are disposed in such a way that an orientation of an image formed on the screen is rotated by 90° with respect to an orientation of the image projected from the beam projector.

19. The stereoscopic image projection system of claim 18, wherein reflective surfaces of the second mirror and the third mirror are perpendicular to a first plane, and a reflective surface of the first mirror is perpendicular to a second plane, different from the first plane.

20. The stereoscopic image projection system of claim 11, wherein the image shutter unit comprises a liquid crystal shutter.

21. The stereoscopic image projection system of claim 11, wherein the shutter controller further comprises an emitter which generates a synchronization signal and wirelessly transmits the generated synchronization signal to the user shutter glasses.

22. A stereoscopic image projection system having a first mode and a second mode, the image projection system comprising:
   a beam projector which projects an image;
   a stereoscopic image adaptor which projects a left and a right side of the image projected from the beam projector onto a screen in a time sequence;
   a driving mirror unit, wherein in the first mode, the driving mirror unit reflects the image projected from the beam projector to the stereoscopic image adaptor, and in the second mode, the driving mirror unit reflects the image from the beam projector directly onto the screen; and
   a shutter controller which synchronizes a time sequential operation of the stereoscopic image adaptor with an opening and closing of a right glasses shutter and a left glasses shutter of a user shutter glasses,
   wherein the stereoscopic image adaptor comprises:
      an image shutter unit comprising a right shutter unit shutter and a left shutter unit shutter respectively receiving the left eye image and the right eye image projected from the beam projector; and
      a second mirror which reflects the right eye image from the right shutter unit shutter to the screen; and
      a third mirror which reflects the left eye image from the left image unit shutter to the screen.

23. The stereoscopic image projection system of claim 22, wherein, in the first mode, the image is a composite image comprising a left eye image and a right eye image arranged in a side by side format.

24. The stereoscopic image projection system of claim 23, wherein the driving mirror unit comprises a switching mirror, and a first mirror,
   wherein the switching mirror is moveable and is switchable between a transparent state and a mirror state, wherein in the first mode, the switching mirror reflects the image from the beam projector to the stereoscopic image adaptor and in the second mode, the first mirror reflects the image projected from the beam projector to the screen.

25. The stereoscopic image projection system of claim 22, wherein the image shutter unit comprises a liquid crystal shutter.

26. The stereoscopic image projection system of claim 22, wherein the shutter controller further comprises an emitter for generating a synchronization signal and wirelessly transmits the generated synchronization signal to the user shutter glasses.

* * * * *